Dec. 26, 1967  G. W. KAMMAN  3,359,871
ROTARY ACTUATOR HUB SEAL
Filed Oct. 22, 1965

INVENTOR.
GORDON W. KAMMAN
BY Hill, Sherman, Meroni, Gross & Simpson ATTORNEYS

United States Patent Office 3,359,871
Patented Dec. 26, 1967

3,359,871
ROTARY ACTUATOR HUB SEAL
Gordon W. Kamman, Buffalo, N.Y., assignor to Houdaille Industries, Inc., Buffalo, N.Y., a corporation of Michigan
Filed Oct. 22, 1965, Ser. No. 501,497
9 Claims. (Cl. 92—121)

This invention relates to improvements in rotary actuators and more particularly relates to an improved hub seal therefor.

In rotary actuators of the type used in confined places, such as for moving the movable air foil parts of aircraft, it is a prerequisite that the actuator be as compact as possible. The difference in diameter between the hub of the actuator and the drive shaft is, therefore, of necessity relatively small. With a small shoulder between the hub and drive shaft it is extremely difficult to provide sufficient sealing space and to obtain sufficient axial thrust to properly load the hub seal against the hub surface of the wingshaft.

A principal object of the invention is to remedy the foregoing difficulties by providing an improved form of wingshaft seal and loading means therefor, making it possible to provide a small diameter actuator with a minimal step between the drive shaft and hub or wingshaft proper, and providing sufficient axial thrust to uniformly load the seal for the entire area thereof.

Another object of the invention is to provide a novel and improved form of wingshaft seal and spring washer loading means therefor, loading the seal with the required axial hub seal thrust and providing uniform annular loading around the seal.

A further object of the invention is to provide an improved form of shaft seal for the wingshaft of a rotary actuator reducing the number of parts heretofore required and loading the seal by a thin flat spring steel washer at the axial thrust required to efficiently seal the actuator chamber.

Still another object of the invention is to provide a new and improved form of wingshaft seal for rotary actuators, in which the seal is surrounded by a thrust ring, and a flat, spring-steel washer abutting the thrust ring is pressed into engagement with said washer to provide a uniform axial thrust on the seal and load the seal to the required extent, and wherein the thrust ring is arranged to take up externally applied axial wingshaft loads.

Figure 1:
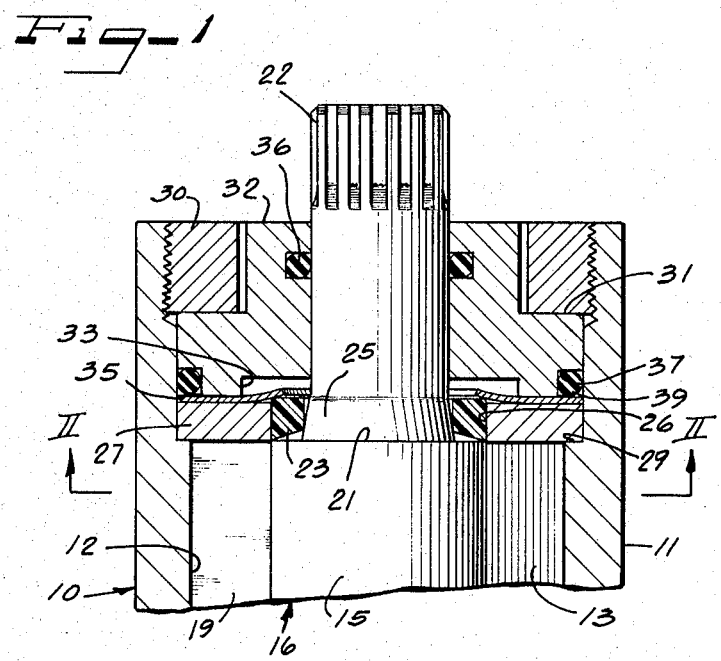
Figure 2:
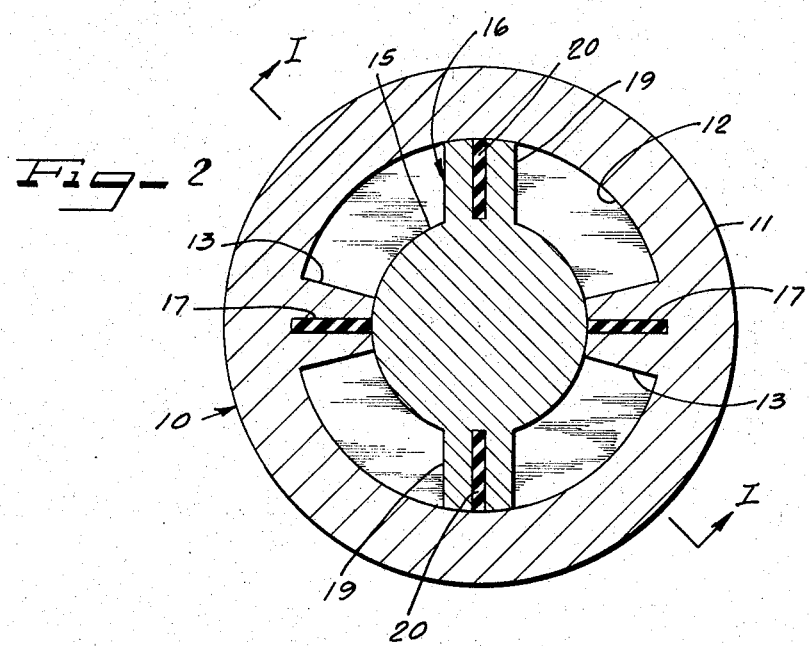

These and other objects of the invention will appear from time to time as the following specification proceeds and with reference to the accompanying drawings wherein:

FIGURE 1 is a partial fragmentary longitudinal sectional view of the driving end of a rotary actuator, illustrating a form of wingshaft seal constructed in accordance with the principles of the present invention, and taken in the direction of the line III of FIGURE 2; and FIGURE 2 is a transverse sectional view taken substantially along line II—II of FIGURE 1.

In the embodiment of the invention illustrated in the drawings, I have shown in FIGURES 1 and 2 the driving end portion of a rotary actuator 10 operated by fluid under pressure to oscillatably drive a shaft 22, particularly adapted to be connected to the air foil parts of aircraft, but which may be connected to oscillatably drive any selected part.

The rotary actuator 10 includes a housing 11 having an interior generally cylindrical wall 12 having diametrically opposed abutments 13, 13 extending inwardly therefrom into engagement with a hub 15 of a wingshaft 16. The abutments 13, 13 are sealed to the periphery of the hub 15, as by abutment seals 17, 17 recessed in and extending along said abutments 13 for the length thereof.

The wing shaft 16 has conventional vanes 19, 19 extending generally radially therefrom and slidably movable along the interior cylinder wall 12 between the abutments 13, 13. The vanes 19, 19 are sealed to the wall 12 as by vane seals 20, 20 recessed in said vanes and extending for the length thereof.

As shown in FIGURE 1, the hub 15 terminates into an end wall 21, perpendicular to the periphery thereof and defining the inner end of an actuator shaft 22. The end wall 21 thus forms a shoulder against which an annular seal 23 is loaded. The shoulder 21 is shown in FIGURE 1 as terminating at its inner end in an inclined ramp 25 extending along the shaft 22 in alignment with the inner peripheral surface of the seal 23. The ramp 21 provides a tapered surface along the shaft 22, forcing the seal 23 into sealing engagement with an inner peripheral wall 26 of a thrust ring 27, forming an end wall of the actuator chamber. The thrust ring 27 is shown as being narrower than the seal 23 and as abutting an outwardly facing annular shoulder 29 formed in the interior wall of the housing 11.

The seal 23 is shown as being basically rectangular in cross-section with a slightly tapering sealing face and as sealing the corner between the shoulder 21 and thrust ring 27, and the inner peripheral wall of said thrust ring. The seal 23 may be made from a suitable resilient sealing material, and preferably a plastic material. One such material which has proved to be a satisfactory seal, having a long life is "Teflon." Other materials may be "nylon" and elastomer and like materials.

The thrust ring 27 may be made from steel and may be hardened to take up the externally applied axial wingshaft loads. The thrust ring is maintained in engagement with the shoulder 29 by a nut 30 threaded in the end of said housing and engaging a shouldered portion 31 of an end cover and bearing 32 for said housing. The end cover and bearing 32 has an inwardly extending axial rib 33 pressing the thrust ring into engagement with the shoulder 29, through the intermediary of a thin, flat steel washer 35, seated on the outer end face of said thrust ring.

The bearing and cover 32 is sealed to the shaft 22 as by an O-ring seal 36 recessed therein and having sealing engagement with the periphery of said shaft. An annular rib 33 is spaced radially inwardly of the periphery of the cover and bearing 32, and provides an inwardly and outwardly opening shoulder 37 for an O-ring seal 39, having sealing engagement with the internal wall of the housing 11 and with the outer face of the spring washer 35.

The spring washer 35 may be a thin, flat spring-washer made from spring steel, and extending along the front face of the thrust ring 27 from the outer periphery thereof radially inwardly of the interior wall 26 of the thrust ring 27 along the outer face of the seal 23. Thus, as the nut 30 is taken up within the housing 11 to maintain the thrust ring 27 in place, the spring washer 35 will be engaged with the outer face of the thrust ring and flexed axially outwardly as it engages the projecting end portion of the annular seal 23. The stored up energy in the spring washer 35 will thus load the seal 23 against the interior wall 26 of the thrust ring 27 and against the 90° corner between the interior wall of said thrust ring and the shoulder 21, to provide an effective seal for the actuator chamber. The loading of the seal may be varied in accordance with the amount the nut takes up on the bearing and cover 32 and in accordance with the thickness of the thrust ring 27, the axial length of the hub seal 23, or by varying the inner diameter of the annular projection 33 of the bearing 32.

It is thus possible to obtain any required axial hub seal thrust by use of the flat spring washer 35. The flat spring washer 35 not only uniformly loads the seal 23 throughout its annular surface but also eliminates the need for a metal back-up ring presently used in conventional actuators, and not herein shown, since it forms no part of the present invention.

It should here be understood that while I have only shown one end portion of the actuator, that the opposite end portion may be like the end portion shown and may be sealed in the same manner.

It should also be understood that while the seal loading spring washer is described as being made from spring steel, that it also may be made from Phosphor bronze and various other materials having the resiliency to press the seal into sealing engagement with the shoulder 21.

While I have herein shown and described one form in which the invention may be embodied, it may readily be understood that various variations and modifications in the invention may be attained without departing from the spirit and scope of the novel concepts thereof.

I claim as my invention:

1. In a rotary actuator,
a housing having an interior wall forming an actuator chamber and having an abutment extending radially inwardly therefrom,
a wingshaft within said housing and having a hub having at least one vane extending radially therefrom,
an actuator shaft extending from said hub,
a shoulder defining the juncture of said actuator shaft and hub, the improvements comprising:
   a thrust ring seated in said housing and having an internal wall of a diameter substantially equal to the external diameter of said hub,
   a seal on said shaft in registry with said internal wall of said thrust ring,
   and a flat spring washer retained in abutting engagement with the outer side of said thrust ring and engaging the outer face of said seal and pressing said seal into sealing engagement with said thrust ring and shoulder with the axial thrust required to seal the end of said housing along said hub.

2. The structure of claim 1,
wherein a cover and bearing is mounted on said shaft and has engagement with the outer face of said washer,
and wherein take up means are provided for clamping said bearing to said washer and loading said washer to take up on said seal.

3. The structure of claim 2,
wherein the seal is made from a resilient sealing material and is basically rectangular in cross section having a tapered sealing face sealing the corner between the hub and thrust ring, and has a greater axial length than the axial length of said thrust ring.

4. The structure of claim 2,
wherein the shaft has a tapered ramp in radial alignment with the internal wall of said thrust ring,
wherein the seal is an annular seal generally rectangular in cross section of a greater axial length than the axial length of said thrust ring,
and wherein the spring washer is a flat spring steel washer engaging the outer face of the seal and loaded to force the seal along said ramp and radially outwardly into sealing engagement with said thrust ring and shoulder, at the juncture between said thrust ring and shaft.

5. The apparatus of claim 4,
wherein a nut threaded in the end of said housing engages said bearing and cover and loads said spring to provide the axial thrust on said seal to effect a tight seal between said hub and thrust ring.

6. A rotary actuator and sealing means therefor comprising:
a hub,
a reduced diameter shaft extending outwardly of said hub,
a housing for said hub and shaft,
a thrust ring seated in said housing at the end of said hub and having an interior wall of substantially the same diameter as the exterior wall of said hub,
a seal within said thrust ring having sealing engagement with the end of said hub and the interior wall of said thrust ring,
a flat thin spring washer engaging the end of said thrust ring and seal,
and means engaging said washer with said thrust ring and loading said washer to provide the axial sealing thrust on said seal required to effectively seal the corner between said thrust ring and hub.

7. A seal in accordance with claim 6,
wherein the seal is an annular seal basically rectangular in cross section having a slightly tapering sealing face and of greater axial dimensions than the axial dimensions of said thrust ring,
and wherein said shaft is tapered toward said hub to provide an annular ramp for said seal, pressing said seal into sealing engagement with said thrust ring upon the exertion of axial thrust thereon by said spring washer.

8. The structure of claim 7,
wherein a bearing and end cover is provided to load said spring washer and seal,
and wherein a nut threaded in said housing presses said end cover and bearing into engagement with said spring washer and loads said seal with the axial end thrust required to seal said hub along the inner wall of said thrust ring.

9. The structure of claim 8,
wherein the end cover and bearing has an annular axially inwardly extending rib engaging said washer and loading said washer to provide the required end thrust on said seal.

References Cited

UNITED STATES PATENTS

| | | | |
|---|---|---|---|
| 996,446 | 6/1911 | Anderson | 308—36.2 X |
| 2,047,329 | 7/1936 | Petersen | 308—36.2 X |
| 2,055,739 | 9/1936 | Wilhelm | 92—125 |
| 2,069,013 | 1/1937 | Nordstrom | 277—90 |
| 2,261,409 | 11/1941 | Ped | 277—189 |
| 2,550,180 | 4/1951 | Allen | 92—125 |
| 2,556,648 | 6/1951 | Gorsuch | 92—125 |
| 2,893,794 | 7/1959 | Ilens | 92—125 |
| 3,032,020 | 5/1962 | Sneen | 92—122 |
| 3,179,018 | 5/1965 | Rumsey | 92—122 X |
| 3,195,421 | 7/1965 | Rumsey | 92—125 X |

MARTIN P. SCHWADRON, *Primary Examiner.*

L. L. JOHNSON, *Assistant Examiner.*